United States Patent [19]

Wroblewski

[11] Patent Number: 5,036,968
[45] Date of Patent: Aug. 6, 1991

[54] POWER CONVEYOR

[76] Inventor: Lucien J. Wroblewski, 8438 N. Kedvale, Skokie, Ill. 60076

[21] Appl. No.: 371,633

[22] Filed: Jun. 26, 1989

[51] Int. Cl.⁵ .................................. B65G 47/26
[52] U.S. Cl. .................... 198/419.1; 198/718; 198/732
[58] Field of Search ............ 198/419.1, 731, 732, 198/733, 717, 718, 719, 725, 726, 728, 730, 729, 734

[56] References Cited

U.S. PATENT DOCUMENTS

| | | | |
|---|---|---|---|
| 2,499,694 | 3/1950 | Stenger | 198/719 X |
| 3,160,263 | 12/1964 | Lewis | 198/719 |
| 3,902,587 | 9/1975 | Checcucci | 198/725 X |
| 3,960,263 | 6/1976 | Isaksson et al. | 198/732 X |
| 4,250,988 | 2/1981 | Miaskoff | 198/719 |
| 4,874,080 | 10/1989 | Wroblewski | 198/463.6 |

Primary Examiner—Robert P. Olszewski
Assistant Examiner—Cheryl L. Gastineau
Attorney, Agent, or Firm—Hill, Van Santen, Steadman & Simpson

[57] ABSTRACT

A device for conveying articles along a path defined by a track, said device having a conveyor for moving the articles along the track in a stop arrangement for interrupting the movement of the articles along the track to create an accumulation of the articles in a batch adjacent the stop arrangement characterized by the conveying arrangement comprising a belt having tines extending from one side, said continuous belt being positioned with only the tines extending into the path for engaging the articles to move them along the track and with the tines slipping past those articles, whose movement has been interrupted by the stop arrangement.

21 Claims, 4 Drawing Sheets

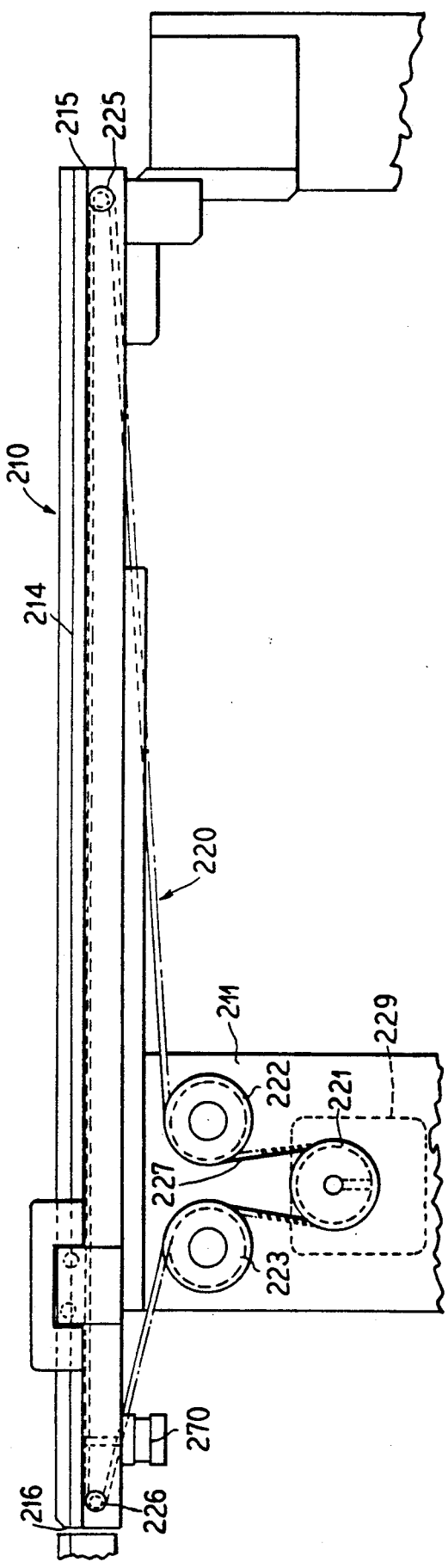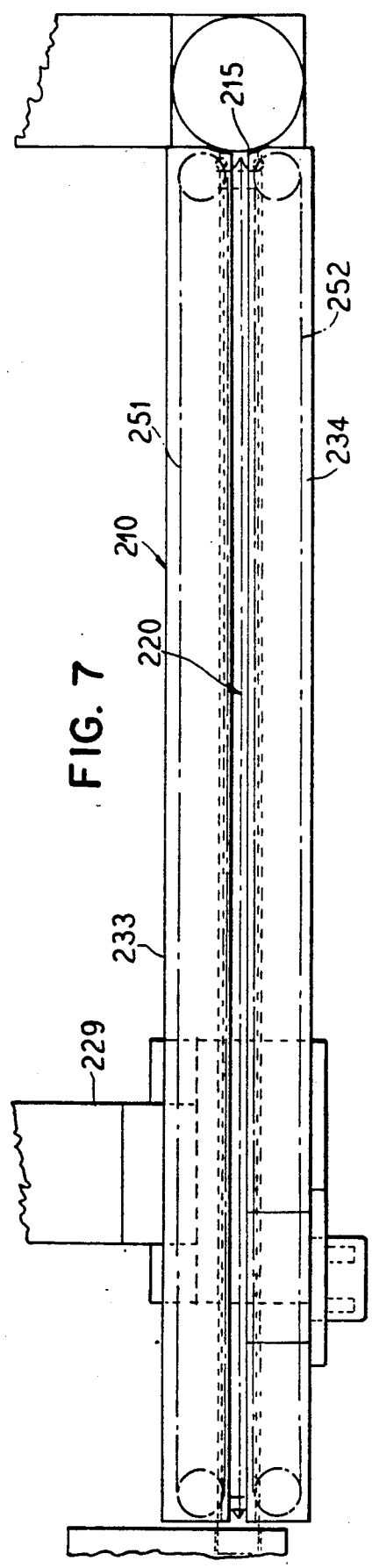

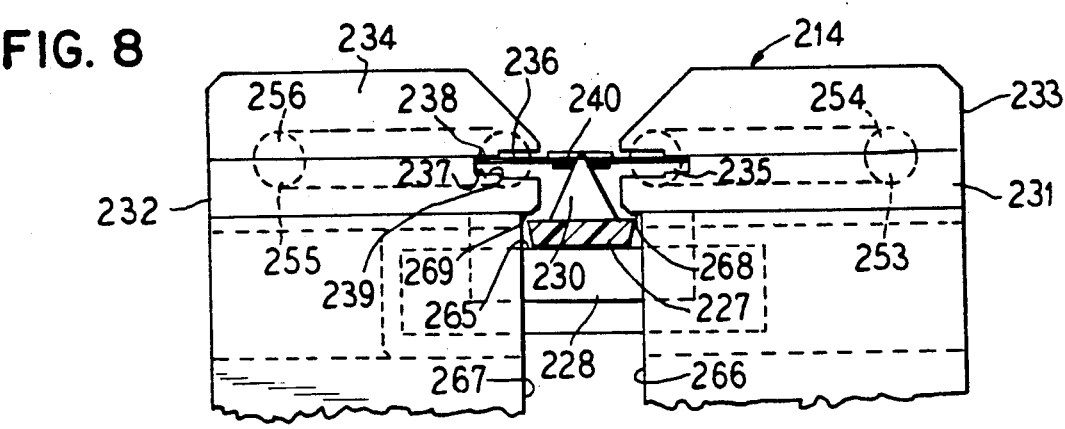
FIG. 8
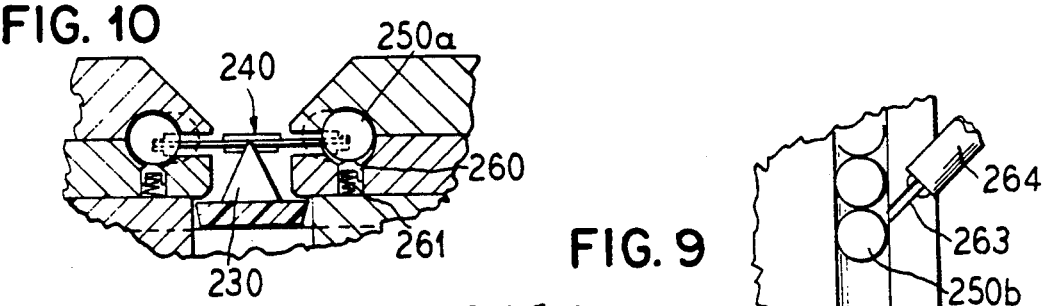
FIG. 10
FIG. 9
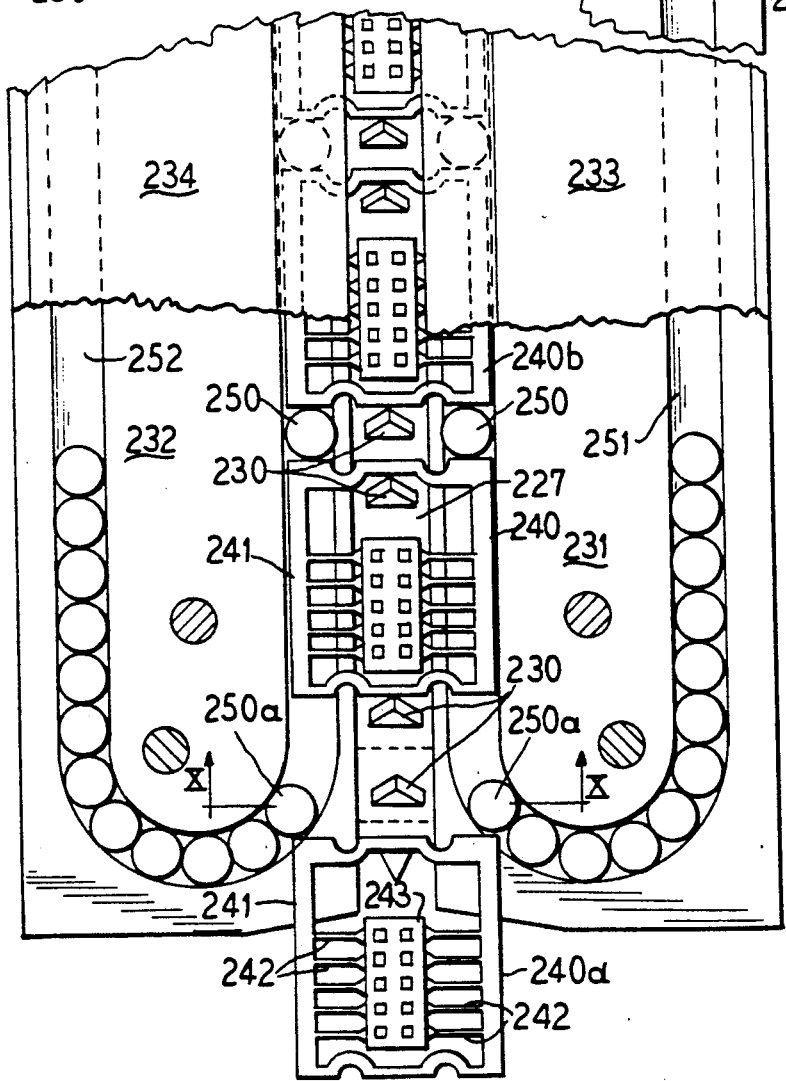

POWER CONVEYOR

BACKGROUND OF THE INVENTION

The present invention is directed to a device for conveying articles along a path from an input end to an output end, which path has an arrangement for stopping the flow of the articles to cause an accumulation thereof and the device maintains the orientation of each of the articles as it moves along the path.

In my copending U.S. patent application Ser. No. 205,379, which was filed on June 10, 1988, and which issued as U.S. Pat. No. 4,874,080 on Oct. 17, 1989, I disclose a conveyor device which receives parts in a desired orientation and conveys the parts in a line to a discharge position where an element of an assembly device picks up a part to transport it to a point for further assembly. In the arrangement of the copending application, the parts were guided between rails or guide surfaces and edges of the parts were supported on moving belts until a stop arrangement prevented their further movements so that they would slide on the surface of the moving belts until released for being removed from the conveyor device. Since the belts form a portion of a supporting surface for the part as it is being moved along a path, the belt always needed to be positioned below a portion of the part. In addition, problems would occur if the path deviated by a substantial amount from a horizontal position because the belts depended on gravitational forces to maintain a frictional force between the part and the surfaces of the belt. Thus, because of the nature of the conveying device, problems occurred when combining this device with other devices or machines because of the requirement that the belts always be positioned below the part being conveyed.

SUMMARY OF THE INVENTION

In order to overcome these problems, the present invention is directed to a conveyor arrangement wherein the conveyor belt does not form a supporting surface for the product being conveyed and, thus, the position of the conveyor belt relative to the path can be changed to allow other devices to act on the articles in the path, if desired.

Another feature of the invention is to provide a device which applies a conveying force to the article, which force is not dependent on the gravitational forces holding the article against the belt, so that the path can be out of a horizontal path.

It is also an object of the invention to provide a conveying device in which the force transferred to the article being conveyed can be changed independent of the amount of contact between the belt and the article.

To accomplish these objects, the present invention is directed to a device for conveying articles along a path from an input end to an output end while maintaining the orientation of the article, said device comprising a frame; a track mounted on the frame and having guide surfaces for engaging and supporting the article to form the path which limits movement of the article only along the path without movement out of said path; stop means mounted on said frame and movable into and out of the path to intermittently interrupt movement of the articles along said path to cause an accumulation of the articles, while said stop means is disposed in said path; conveyor means for moving the articles along the path including a continuous belt having projecting, resilient tines extending from one side of the belt, said belt being mounted for movement with a portion moving along said path and with the tines engaging said articles in the track, and drive means for moving said belt along said path so that the articles are engages by said tines of the belt to be moved along said path until movement is stopped by said stop means at which time the tines pass by the articles that are being accumulated at said stop means.

Because the tines of the belt will engage the article when they are imposed into the path of the article, regardless of whether the belt is positioned above the path, along the side of the path, or below the path, many different designs are possible. For example, in one embodiment the device is used for accumulating a plurality of parts which are to be packaged in a package containing a given number of parts. In order to accomplish this, a ram which is actuated after a given number of parts has been accumulated coacts to engage the accumulated parts and to move them faster than the speed of the belt so that the accumulated parts are moved from the track at a faster rate than the parts being fed into the track at the inlet end by the belt.

In another embodiment, extremely thin parts are being conveyed along the track and are removed from the outlet end by a standard-type escapement arrangement. In this embodiment, in order to maintain spaces between the parts and prevent them from entering into a shingled relationship or becoming overlapped, spacing balls are provided between each of the articles to maintain the spacing between the articles and to compensate for any warping or misalignment in the thin articles.

Other features and advantages of the invention will be readily apparent from the following description of the preferred embodiments, the drawings and the claims.

BRIEF DESCRIPTION OF THE DRAWINGS

FIG. 4 is a cross sectional view of a modification of the belt used in accordance with the present invention;

FIGS. 5a-5d are all side views of the belt of the present invention showing various rake angles for the tines of the belt with FIG. 5a showing a neutral rake angle, FIG. 5b showing a positive rake angle, FIG. 5c showing a negative rake angle, and FIG. 5d showing a combined rake angle;

FIG. 6 is a side view of another embodiment of the present invention;

FIG. 7 is a top plan view of the embodiment of FIG. 6:

FIG. 8 is an enlarged end view taken at the right-hand end of FIG. 7;

FIG. 9 is an enlarged top view of the right end of the device of FIG. 6 with portions broken away for purposes of illustration; and FIG. 10 is a partial cross sectional view taken along the lines X—X of FIG. 9.

DESCRIPTION OF THE PREFERRED EMBODIMENTS

Figure 1:
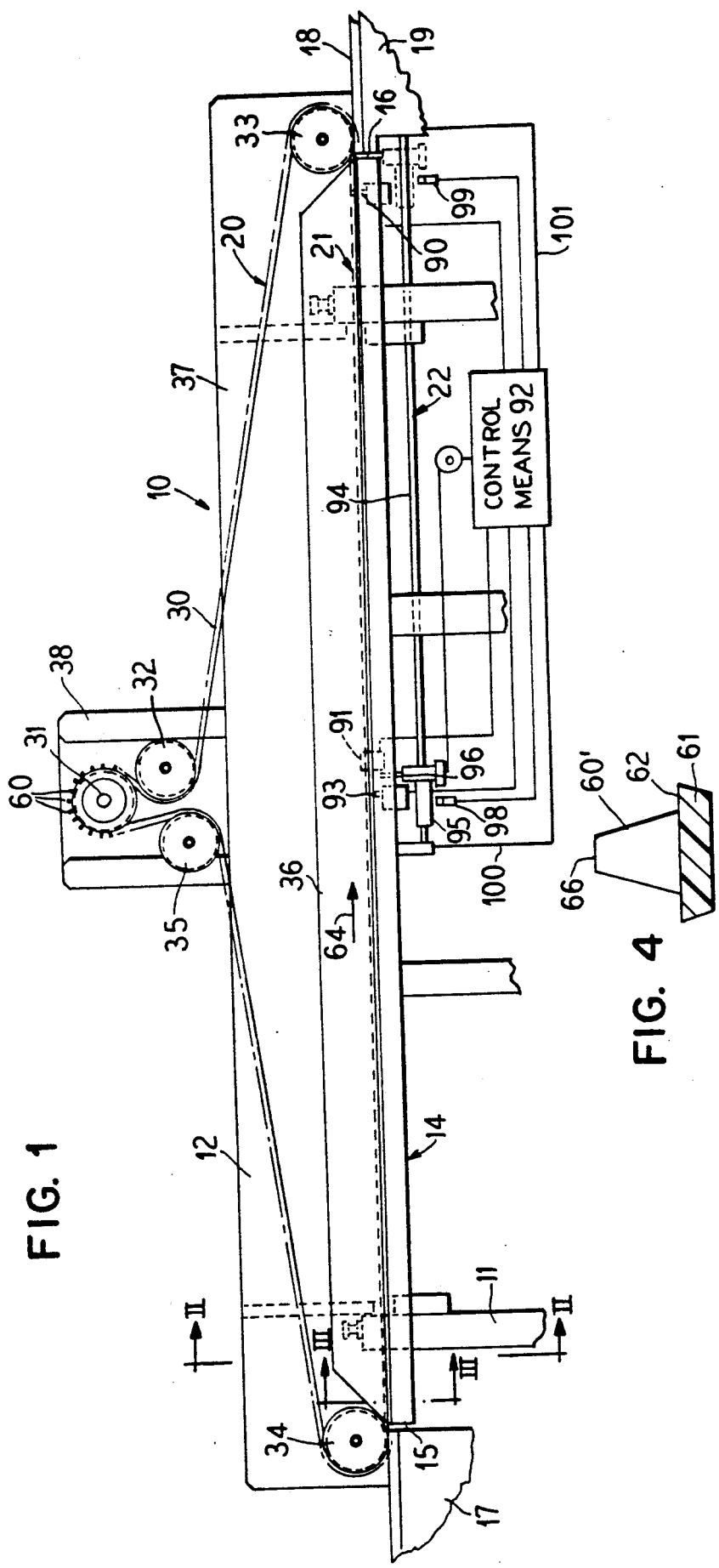
FIG. 1 is a side view of the embodiment of the device in accordance with the present invention.

The principles of the present invention are particularly useful when incorporated in a device, generally indicated at 10 in FIG. 1. The device 10 has a frame with a lower frame portion 11 and an upper frame portion 12, which are connected together by a pivotable connection 13 (see FIG. 2). A track 14 is positioned on the lower frame 11 (see FIG. 1) and has an inlet end 15 and an outlet or exit end 16. The device 10 also includes a first conveying arrangement or means, generally indicated at 20, for moving an article along the track 14 from the inlet end 15 towards the outlet end 16. The device 10 also includes means, generally indicated at 21, which will accumulate articles in the track adjacent the outlet end 16 and a second conveying means 22 for moving a batch of the accumulated articles out the exit end 16.

The track 14 receives the articles one at a time in the desired orientation from a feed device, such as 17, which is positioned to introduce the articles to the inlet end 15. The batches, which are formed adjacent the outlet end 16, are moved by the second conveyor means 22 as a batch out the outlet end 16 into a tubular container or shipping package 18, which is positioned by a table or support 19.

The first conveying means 20 includes an endless belt 30, a drive pulley 31, pulleys 32, 33, 34 and 35, as well as a belt support 36. The two pulleys 33 and 34, as well as the belt support 36, are mounted on a frame member 37 of the upper frame portion 12. These pulleys 33 and 34 and the belt support 36 define a path which extends substantially along the track 14. The drive pulley 31 and the idler pulleys 32 and 35 are mounted on an upper portion 38 to be positioned above the frame member 37. The upper frame member or portion 38 supports drive means 39 (see FIG. 2), which includes an electrical motor and, if desired, a reduction gear for driving the pulley 31.

Figure 2:
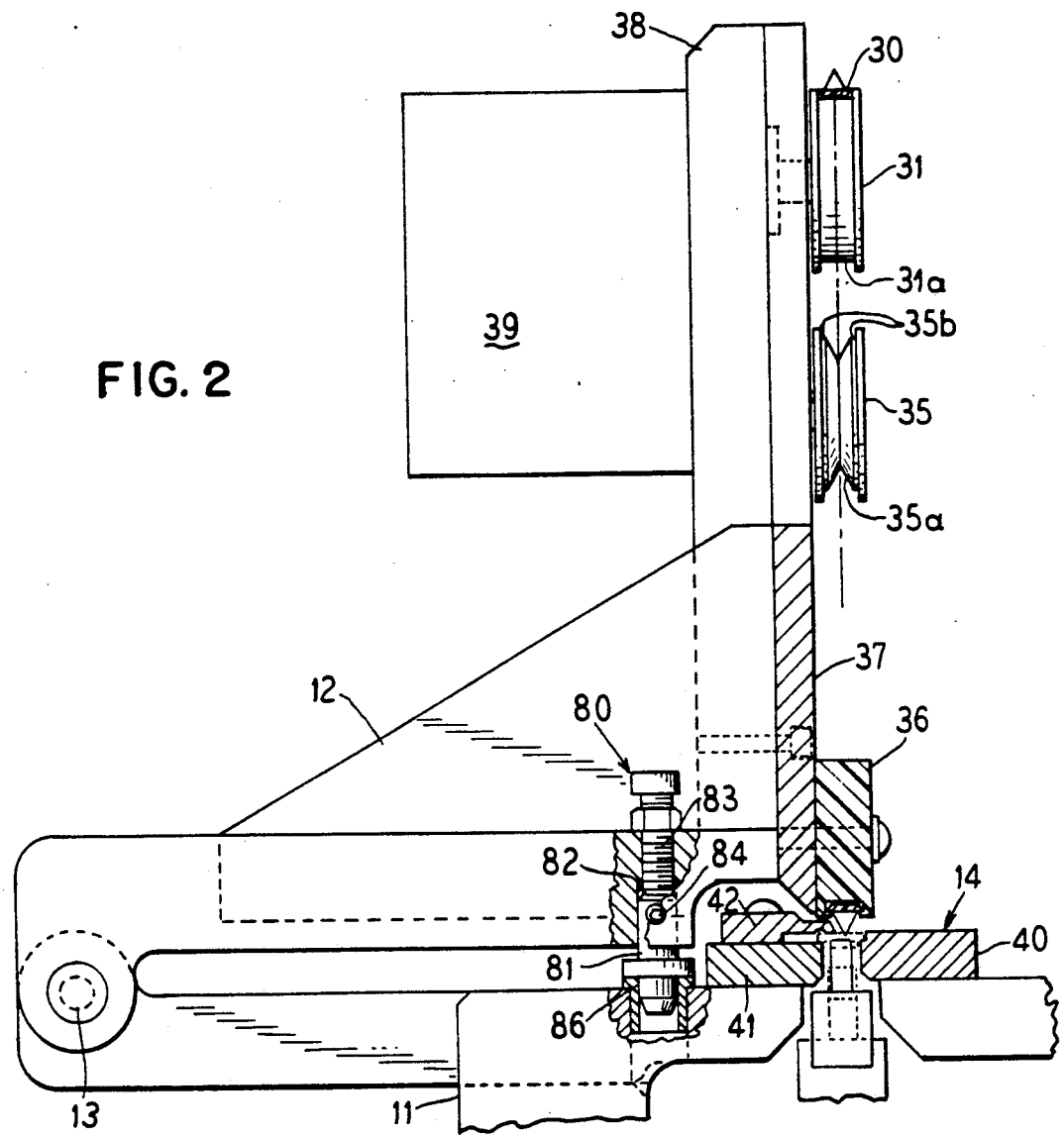
FIG. 2 is a cross sectional view with portions broken away for purposes of illustration taken along the lines II—II of FIG. 1.
Figure 3:
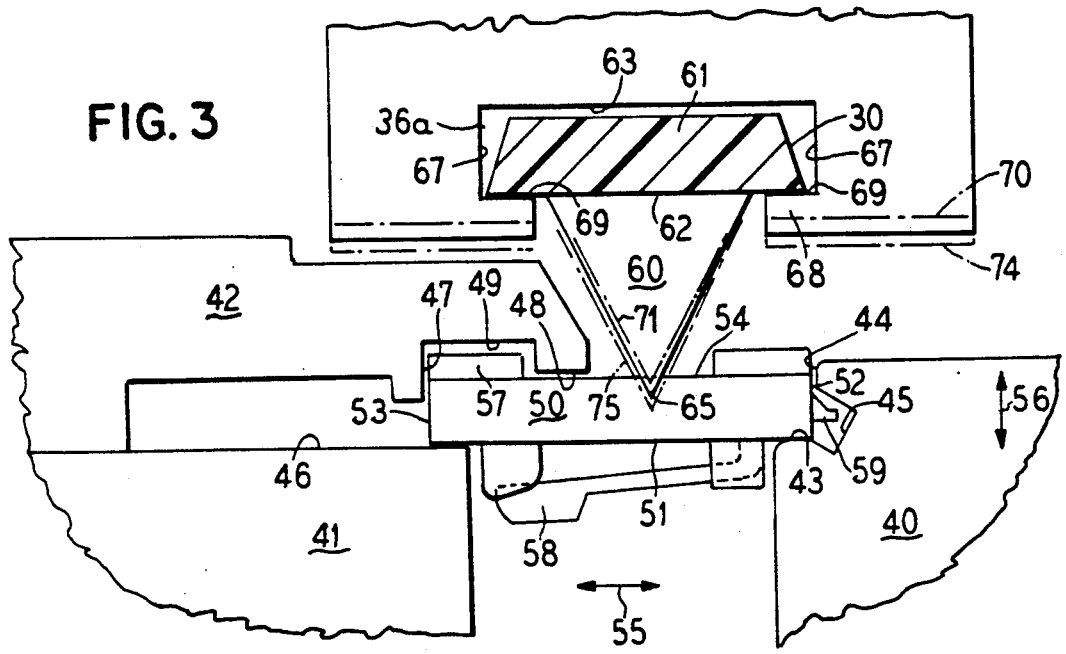
FIG. 3 is an enlarged cross sectional view with portions removed for purposes of illustration taken along the lines III—III of FIG. 1.

The track 14, as best illustrated in FIGS. 2 and 3, is formed of three members 40, 41 and 42. As illustrated, the member 40 has a horizontal guide surface 43 and a vertical guide surface 44 with a longitudinally extending notch or groove 45 that is positioned between these two guide surfaces. The member 41 has a guide surface 46 which extends parallel and is in the same plane as the surface 43 of the member 40. The member 42 has a vertical guide surface 47, and a horizontal guide surface 48, which is separated from the vertical guide surface by a notch or longitudinally extending groove 49. These guide surfaces 43, 44, 46, 47 and 48 are constructed to receive an article 50 and to guide it for movement only along the length of the path formed by the track 14. As illustrated, the article 50 has a lower surface 51, two end surfaces 52 and 53 and an upper surface 54. As best illustrated in FIG. 3, the vertical surface 44 and 47 coact with the end surfaces 52 and 53 to limit movement in the horizontal direction indicated by the double arrow 55. In a similar manner, the lower horizontal surfaces 43 and 46, as well as the upper horizontal surface 48, coact with the two surfaces 51 and 54 of the article 50 to limit or restrain vertical movement in the direction of the double arrow 56. The members 40, 41 and 42 are constructed with notches or grooves, such as a notch 49, to receive projections or protrusions, such as 57, on the article 50 and the spacing between the two members 40 and 41 is such to allow for the lower projections, such as 58. Finally, the groove 45 receives a lateral projection 59 from the surface 52. Thus, it can be seen that the various guide surfaces, such as 43, 44, 46, 47 and 48, cooperate to entrap the article 50 and to limit its movement in the horizontal direction indicated by the double arrow 55 and the vertical direction indicated by the arrow 56.

The belt 30 has a base portion 61 with a plurality of resilient, integral tines 60 extending from a base surface 62 (FIG. 3) and the belt is positioned with the tines 60 extending downward into the path formed by the guide surfaces of the track 14. Thus, more than one of the tines 60 will frictionally engage a portion of the article 50 and will form transfer means to frictionally transfer linear forces from the belt to the article to carry the article along the track as the belt moves in the direction of the arrow 64 (FIG. 1). In the embodiment illustrated in FIG. 3, each of the tines 60 has a triangular configuration and is terminated in a point 65, which will engage the article 50. It is possible to shape the tines so that, instead of converging to a point, they converge to an end surface, such as 66, as illustrated by the modified tine 60, of FIG. 4.

The belt support 36 has a groove 36*FI3*) which has a base surface 63 and two lateral guide surfaces 67, 67. As illustrated, lateral projections 68, 68 overhang a portion of the groove to provide guide surfaces 69, 69 which face the base surface 63. These guide surfaces 69, 69 coact with the base surface 63 to limit movement of the belt in the direction 56 and the lateral surfaces 67, 67 limit movement of the belt in the direction 55.

As shown in FIG. 2, the drive pulley or sheave 31 has a groove with a cylindrical base 31a to receive the base portion 61 of the belt 30. The idler pulley or sheave 35 has a V-shaped groove 35a between cylindrical portions 35b so that the tines extend in the V-shaped groove 35a as the outer portions of the base surface 62 of the belt 30 are supported on the cylindrical portions 35b. The pulley or sheave 32 is the same as the pulley 35 and pulleys or sheaves 33 and 34 are the same as the pulley 31.

As best illustrated in FIG. 5a, tines are spaced along the length of the belt with the distance between adjacent tines being a pitch P. Each of the tines 60 has a thickness T. In addition, each of the tines 60 will have a rake angle relative to the direction of movement indicated by the arrow 64. The tines 60a of FIG. 5a have a neutral or zero rake angle which is approximately 90°. The tines 60b of FIG. 5b have a positive rake angle relative to the direction 64 which is less than 90°. The tines 60c of FIG. 5c have a negative rake angle of more than 90°. Finally, it is possible to provide tines 60d of FIG. 5d, which are a combined rake angle having both a negative portion and a positive portion.

The selection of the pitch P between the tines, the rake angle of the tines, the thickness T of each of the tines, along with the stiffness of the material forming the belt, coact with the amount of contact between each of the tines to determine the amount of frictional force being applied by the transfer means to each of the articles as it moves in the track. The material for the belt is preferably a polyurethane, which may be tempered, and has a Durometer hardness of 85 Shore A. Once the belt has been selected with the desired pitch, tine thickness, rake angle and material, the only variable in the device 10 is the amount of penetration of the tip, whether it is a point 65 or the blunt tip 66 illustrated in FIG. 4, into the path of the article.

In the device 10, the amount of penetration shown in FIG. 3 can be controlled by raising and lowering the upper frame portion 12 relative to the lower frame portion. As illustrated in bold lines, the amount of penetration of the point 65 has a depth shown in bold lines. By raising the frame to raise the belt support 36 to the upper chain line position 70 the amount of penetration can be changed to that shown by chain line 71, which is substantially less than the penetration shown by the bold line. It is also possible to lower the upper frame so that the lower edge of the belt support 36 assumes the position 74 to cause penetration shown by chain line 75.

In order to raise and lower the belt relative to the track, adjustment means 80 are provided on each of the two pairs of arms which pivotably connect the upper portion 12 to the lower portion 11. As illustrated in FIG. 2, one of the adjustment means 80 includes a pin 81 which is received in a smooth bore 82 with the amount of insertion of the pin 81 into the bore 82 being controlled by an adjustment arrangement including a threaded member 83. The pin is held in the smooth bore by a set screw 84 and the pin is received in a socket formed by a bushing 86. By changing the amount of penetration of the pin 81 into the bore 82, the distance of the upper frame portion 12 from the lower frame portion 11 can be changed to change the amount of penetration of the tines 60 of the belt into the path.

The means for accumulating articles, such as the article 50 in the right-hand end of the track illustrated in FIG. 1, includes a first stop 90 which can be raised and lowered into the path. The stop 90, in the raised position, prevents passage of the article and causes an accumulation of the articles as the articles are being carried by the belt 30 of the first conveying means 20. Once the movement of an article has been stopped, either by the stop 90 or by engaging an article already stopped, the tines will easily move over the article so that the belt can continue to move.

The object of the device 10 is to accumulate a number of articles into a batch, for example twelve articles. When the twelfth article of the batch has been moved into the batch, it will be sensed by a sensor 91, which will send a signal to the control means 92, which signal is used to raise a second stop 93 into the path of the next following article to prevent it from being added to the batch of twelve articles. In addition, the control means 92 will deactivate the means holding the first stop 90 in the path to cause it to be withdrawn and, at the same time, actuate the second conveyor means 22 to move the batch of twelve articles rapidly out the outlet 16 into the tubular package 18. As illustrated, the second conveyor means includes a guide tube 94, which forms a cylinder which has a piston received therein and a carriage 95 sliding on the guide tube 94. The piston in the tube 94 is coupled to the carriage 95, such as by a magnetic attraction, so that the carriage will move with the piston when air pressure is applied at an end of the cylinder 94. The carriage 95 includes a raisable stop 96, which is movable into and out of the path of the track 14. The conveyor also includes a sensor 98 to sense the carriage 95 in the retracted position, which is illustrated in FIG. 2, and also a sensor 99 to indicate the forward position of the carriage, as illustrated in broken lines. It should be noted that the actual structure and construction of the carriage and its movement are considered conventional.

As mentioned, the device operates in the following manner. The belt 30 of the first conveying means 20 moves the articles in a stream, one after another, along the track until the first article of the stream's movement is stopped or arrested by the presence of the forward stop 90. As the articles accumulate one after another, a batch is being formed. When the last article of the batch, which is assumed as the twelfth article, comes to rest, it is sensed by the sensor 91, which sends the command signal to the control means, which causes the rear stop 93 to be actuated to prevent any additions to the batch, lowers the front stop 90 to allow the batch to be carried by the belt 30 towards the outlet, causes the projecting stop 96 on the carriage 95 to be moved in behind the last article of the batch and applies air through the hose 100 to cause the piston to move through the tube or cylinder 94 to move the carriage 95 towards the discharge end to rapidly expel the batch into the packing tube 18. As the piston passes the sensor 99, the control means stops the flow in the line 100, adds flow in a line 101 to reverse the piston back to the initial position to carry the carriage to the original starting position. At the same time, the stop or catch 96 on the carriage 95 is dropped to the retracted position so that it will not interfere with any article in the track, the rear stop 93 is retracted, while the front stop 90 is, again, raised into a blocking position. Thus, the belt will carry any articles which have accumulated on the stop 93 towards the stop 90 and the accumulation of the next batch will then be started. Since the batch is inserted into a packing tube, such as 18, and the control means can include sensors to determine the presence of an empty tube. Each of the stops 90, 93 and 96 can be shifted between a position retracted from the path and position blocking the path by an air cylinder arrangement or by electrical solenoids.

The device 10, besides enabling the accumulation of a batch, also allows conveying the batch at a speed greater than the speed for conveying the articles into the accumulating stop to form the batch. The belt 30, with its tines, thus, is having three different relationships during different steps of the above-mentioned cycle. As an article is being conveyed into the inlet 15 of the track 14, the belt moves the article without any slippage. Once the article is stopped from further movement by either engaging a stop 90, a stop 93 or a previously stopped article, the tines will slip over the article without causing any damage. When the batch is being shifted from the track by the second conveying means 22, the batch of articles move faster than the tines and, thus, the batch will be slipping by the tines because of the increased speed over that of the speed of advance for the belt 30. Since the track provides all of the support for the articles and also prevents any movement in any direction other than in the direction 64, no problems will occur from moving the articles at the same speed as the belt, holding the articles so that the belt is moving faster than the article or moving the articles faster than the speed of the belt, which are all conditions and relationships between the article of the belt and the tines of the belt during the operations of the device 10.

An embodiment of applicant's invention is illustrated in a device, generally indicated at 210 in FIGS. 6 and 7. In the device 210, a frame 211 supports a track 214, which has an inlet 215 and an outlet 216. The device 210 includes conveyor means 220, which includes a drive pulley 221, a pair of idler pulleys 222, 223, a head pulley 225 and an outlet pulley 226. A continuous belt 227, which has tines 230, is wrapped around the pulleys and is supported on a belt support 228 (FIG. 8) along a path extending between the inlet pulley 225 and the outlet pulley 226. To drive the drive pulley 225, it is connected to a drive shaft on a drive source, such as 229, which can include an electric motor and a reduction gear, if desired.

As best illustrated in FIG. 8, the track 214 is formed by two bottom plates 231 and 232, which coact with two top plates 233 and 234. The plates 231 and 233 have depressions to form a groove 235, while the plates 232 and 234 have a similar groove 236. The two grooves 235, 236 provide lateral guides surfaces, such as 237, upper guide surfaces 238 and lower guide surfaces 239 which guide an article 240 as it moves from the inlet 215 to the outlet 216.

The articles 240, as illustrated in FIGS. 8, 9 and 10, include a sheet metal frame 241, which has legs 242 that are interconnected to a center member 243 which can be a component. The sheet metal frame 241, as illustrated in FIGS. 8 and 10, is extremely thin and, due to processing, can be warped or curved within a certain limit with the article 240 still being a useful article. Thus, the upper and lower guide surfaces, such as 238 and 239, have a fairly wide spacing which allows the sheet metal frame 241 to shift laterally a slight amount.

In order to maintain a spacing between each of the articles 240 and to prevent a leading edge of the frame of one article from either riding up over the trailing edge of the frame of the preceding article or riding underneath, spacer balls 250 are provided and move in ball tracks or passages 251 and 252. Each of the ball tracks, such as the ball track 251, is formed by grooves 253 in the member 231 and coacting with a groove 254 in the member 233. The ball track 252 is formed in a similar manner by a groove 255 in the member 232 coacting with a groove 256 of the member 234. Each of the ball passages or tracks 251 and 252, as best illustrated in FIG. 7, extend the length of the track 214 with one portion or leg of each groove being adjacent the gap between the members forming the track and the other return side or leg being spaced outwardly therefrom. Thus, each of the balls 250 can move around the oval-shaped track from the exit end back towards the entrance end. Each of the tracks, such as the track 251 is provided with a detent 260 formed by a spring 261 biasing a member into the path of the track to hold a ball in a beginning position illustrated by the balls 250a in FIGS. 9 and 10. To insure that the balls returning on the outside leg of the track will be fed into the position for being engaged by the detent, each of the tracks, such as the track 251 (see FIG. 9) is provided with an air inlet 263 connected to an air line 264, which feeds a small stream of air against the ball, such as the ball 250b, to urge it towards the detent.

When an article, such as an article 240a, enters the inlet 215 of the track 214, its leading edge of its frame will engage the balls 250a, which are held by the detent. Thus, the ball 250a held by the detent will be forced into the track ahead of the article 240a as it enters to obtain the spacing, such as illustrated between the articles 240 and 240b in FIG. 9.

As illustrated, the tines 230 of the belt 227 will penetrate into the frame 241 of the article 240. As in the previous embodiment, by raising and lowering the position of the belt support 228, the amount of penetration can be changed.

The belt support 228 has a support surface 265 and the support 228 is positioned between lateral guide surfaces 266, 267. The member 231 and 232 overhang the lateral guide surfaces 266 and 267, respectively, and form upper guide surfaces 268 and 269. The guide surfaces 265, 266, 267, 268 and 269 coact to limit movement at right angles to the path of the track 214.

In the device 210, adjacent the exit end 216 of the track 214, a stop 270 of a conventional escapement arrangement can be provided to cause an accumulation of the articles being transported along the track by the conveying means 220. Thus, the articles will be moved toward the stop, such as 270 and, as the article engages the stop 270, an accumulation of a string of articles will occur so that there is slippage between the tines 230 of the belt 227 and each of the articles whose movement in the track has been stopped. When the escapement device releases the leading article, the belt will carry it to the discharge end or outlet end 216 of the track 214 where the article can be gripped by a further processing device. It should be pointed out that each of the articles, such as 240, are introduced to the inlet end 215 in the desired orientation which has been achieved by utilizing known sorting and orienting devices. It also should be noted that, as illustrated in FIG. 9, each of the tines 230 have a slight positive rake angle.

It should be noted that as the articles leave the track, they push the balls ahead of them around the round curve of each of the tracks 251 and 252 towards the return leg of these tracks.

It is also noted that in this embodiment, the belt is positioned so that the tines are introduced from below into the track or path of the articles. It is possible to change the position of the belt support, such as 228, so that the amount of penetration of the tine 230 is different and it is also possible to change the angle of the support 228 relative to the track so that the amount of penetration can change along the length of the track to change the amount of force being transferred to each of the articles.

While not illustrated in either of the illustrated embodiments, it is possible for the belt, which is coacting with the track, to not be absolutely parallel to the guide surfaces of the track. This will allow varying the amount of frictional force along the length of the path due to changing the amount of engagement between the tines and the article being conveyed at a specific point. It also should be pointed out that while the track forms a belt path which generally lies in a single plane, it could be a curved path that extends out of the single plane and the belt could also assume a path that curves out of a single plane.

As mentioned, the embodiment illustrated by the device 210 enables handling articles which have very thin portions which can be warped out of a single plane because of the incorporation of the ball tracks with the spacer balls between each of the articles. As in the earlier-described embodiment, the belt 227 is not used for supporting the article as it moves between the inlet and outlet of the device. The belt's sole purpose is to impart movement to the article and, because of the resiliency in the tine, allow the belt to move past the article when the article is being retained by a stop or has been accumulated in a batch.

Although various minor modifications may be suggested by those versed in the art, it should be understood that I wish to embody within the scope of the patent granted hereon all such modifications as reasonably and properly come within the scope of my contribution to the art.

I claim:

1. A device for conveying articles with a desired orientation from an input end to an output end, said device comprising a frame; a track mounted on said frame and having guide surfaces extending between the input and output ends for engaging and supporting the article to form a path which limits movement of the articles to only a single direction along said path between the input and output ends; stop means mounted on said frame for intermittently moving into said path for preventing movement of an article along said track to cause an accumulation of the articles on said path; and conveying means for moving the articles along said path, said conveyor means including a continuous belt having transfer means for frictionally engaging the article and directly transferring linear forces from the belt to the articles, said transfer means being projecting resilient integral tines extending from one side of the belt, said belt being mounted for movement with a portion moving along said path and said tines extending into the track to frictionally engage each of said articles in the track with more than one tine, said conveying means including drive means for moving said belt at a constant speed so that said articles are frictionally engaged by said tines of the belt to be carried along the path of said track until movement of the article is stopped by said stop means, at which time said tines bend and slip past said article.

2. A device according to claim 1, wherein the conveying means includes a belt support mounted on said frame to support a portion of the belt moving along said path.

3. A device according to claim 2, wherein said belt support includes lateral guide surfaces for limiting the lateral movement of said belt.

4. A device according to claim 1, which includes a second conveying means for engaging a batch of accumulated articles of a given number and moving the engaged batch along the track at a higher rate of speed than the rate of speed of the belt of the first-mentioned conveying means.

5. A device according to claim 1, wherein the conveying means is positioned above the track so that the tines of the belt engage an upper surface of the articles being moved by said conveying means along said track.

6. A device according to claim 5, which includes a second conveying means for engaging articles along the track disposed in a certain portion of said track to move the articles at a speed different than the speed of movement of the belt of the first-mentioned conveying means.

7. A device according to claim 6, wherein said second conveying means is positioned for engaging a batch of articles accumulated by said stop means, said second conveying means being intermittently actuated.

8. A device according to claim 1, wherein the stop means is located adjacent the output end, said device including sensing means spaced inward from said stop means for sensing the last article in a batch of articles of a given number, second stop means positioned adjacent said sensing means for stopping addition of articles to the batch when the sensing means senses the last article of the batch, second conveying means for engaging the last article of the batch and moving the batch in response to a command from said sensing means out of the output of said track.

9. A device according to claim 1, wherein said track includes a passage presenting spacing balls between each of the articles as they move along said track, said passage including detent means for holding a ball to be engaged by a leading edge of an article being introduced into the track and said passage having a return leg for returning the balls for recirculation.

10. A device according to claim 1, wherein said guide surfaces are arranged in a first pair and a second pair, said first pair limiting movement of the article in a first direction extending perpendicular to said single direction of the path and the second pair limiting movement of the article in a second direction perpendicular to both the first direction and said single direction.

11. A device for conveying articles with a desired orientation from an input end to an output end, said device comprising a frame; a track mounted on said frame and having guide surfaces extending between the input and output ends for engaging and supporting the article to form a path which limits movement of the article to only a single direction along said path between the input and output ends; stop means mounted on said frame for intermittently moving into said path for preventing movement of an article along said track to cause an accumulation of the articles on said path; and conveying means for moving the articles along said path, said conveyor means including a continuous belt having a base with projecting resilient integral tines extending from a surface of the base and from one side of the belt, said base having a width greater than a width of said tines, said belt being mounted for movement with a portion moving along said path and said tines extending into the track to engage said articles in the track, said conveying means including a belt support being mounted on said frame to support the portion of the belt moving along said path, said belt support including lateral guide surfaces with guide surfaces extending inward therefrom to coact to enclose a portion of the base and to limit both lateral and vertical movement relative to the path of the track, said conveying means including drive means for moving said belt at a constant speed so that said articles are engaged by said tines of the belt to be carried along the path of said track until movement of the article is stopped by said stop means, at which time said tines bend and slip past said article.

12. A device for conveying articles with a desired orientation from an input end to an output end, said device comprising a frame; a track mounted on said frame and having guide surfaces extending between the input and output ends for engaging and supporting the article to form a path which limits movement of the article to only a single direction along said path between the input and output ends; stop means mounted on said frame for intermittently moving into said path for preventing movement of an article along said track to cause an accumulation of the articles on said path; and conveying means for moving the articles along said path, said conveyor means including a continuous belt having a base with a base surface and projecting resilient integral tines extending from said base surface at a spaced interval, each of said tines having a width adjacent the base surface less than the width of the base of the belt, and each tine tapering from the base surface to a tip portion having a width less than the tine adjacent said base surface, said belt being mounted for movement with a portion moving along said path and said tines extending into the track to engage said articles in the track, said conveying means including drive means for moving said belt at a constant speed so that said articles are engaged by said tines of the belt to be carried along the path of said track until movement of the article is stopped by said stop means, at which time said tines bend and slip past said article.

13. A device according to claim 12, wherein the tip portion of said tine forms a pointed tip.

14. A device according to claim 12, wherein each of the tines has a constant thickness and extends approximately at right angles to the base surface to form a neutral rake angle for the tine.

15. A device according to claim 12, wherein each of the tines extends at an angle to the base surface other than 90°.

16. A device according to claim 12, wherein each of the tines has a portion extending at an angle other than 90° to the base surface and has a second portion extending at an angle to the first portion to form a combined rake angle for the tine.

17. A device for conveying articles with a desired orientation from an input end to an output end, said device comprising a frame; a track mounted on said frame and having guide surfaces extending between the input and output ends for engaging and supporting the article to form a path which limits movement of the article to only a single direction along said path between the input and output ends; stop means mounted on said frame for intermittently moving into said path for preventing movement of an article along said track to cause an accumulation of the articles on said path; and conveying means for moving the articles along said path, said conveyor means including a continuous belt having projecting resilient integral tines extending from one side of the belt, said belt being mounted for movement with a portion moving along said path and said tines extending into the track to engage said articles in the track, said frame having a first portion for supporting the track and a second portion for mounting the conveying means, said second portion being adjustably positioned relative to the first portion to enable varying the amount of penetration of the tines into the path of the articles in said track, said conveying means including drive means for moving said belt at a constant speed so that articles are engaged by said tines of the belt to be carried along the path of said track until movement of the article is stopped by said stop means, at which time said tines bend and slip past said article.

18. A device for conveying articles with a desired orientation along a path from an input end to an output end, said device comprising a frame; a track mounted on said frame and having a first pair and a second pair of guide surfaces engaging the article, said first pair limiting movement of the article in a first direction perpendicular to the path and the second pair limiting movement of the article in a second direction perpendicular to both the first direction and the path so that the articles move only along said path between said input and output ends; stop means mounted on said frame for interrupting movement of an article along the path to cause an accumulation of the articles on said path; conveying means including a continuous belt having a base portion along one side with integral resilient tines extending from said base portion, means mounting said belt with the tines projecting into the path, said means for mounting including a belt support having guide surfaces for limiting movement of the belt at right angles to the path, said conveying means including drive means for moving said belt at a constant speed so that articles are frictionally engaged by tines of the belt to be carried along the path of said track until movement of an article is stopped by said stop means at which time the tines will bend and continue to move past said stopped article.

19. A device according to claim 18, wherein the conveying means is positioned on the frame above the track means with the tines extending downward into said path.

20. A device according to claim 18, wherein each of said tines tapers from the base surface toward a tip having a width less than the width of the tine adjacent the base surface.

21. A device according to claim 18, wherein the spacing of the tines is less than the length of the article being conveyed so that each article is frictionally engaged by more than one tine.

* * * * *